UNITED STATES PATENT OFFICE.

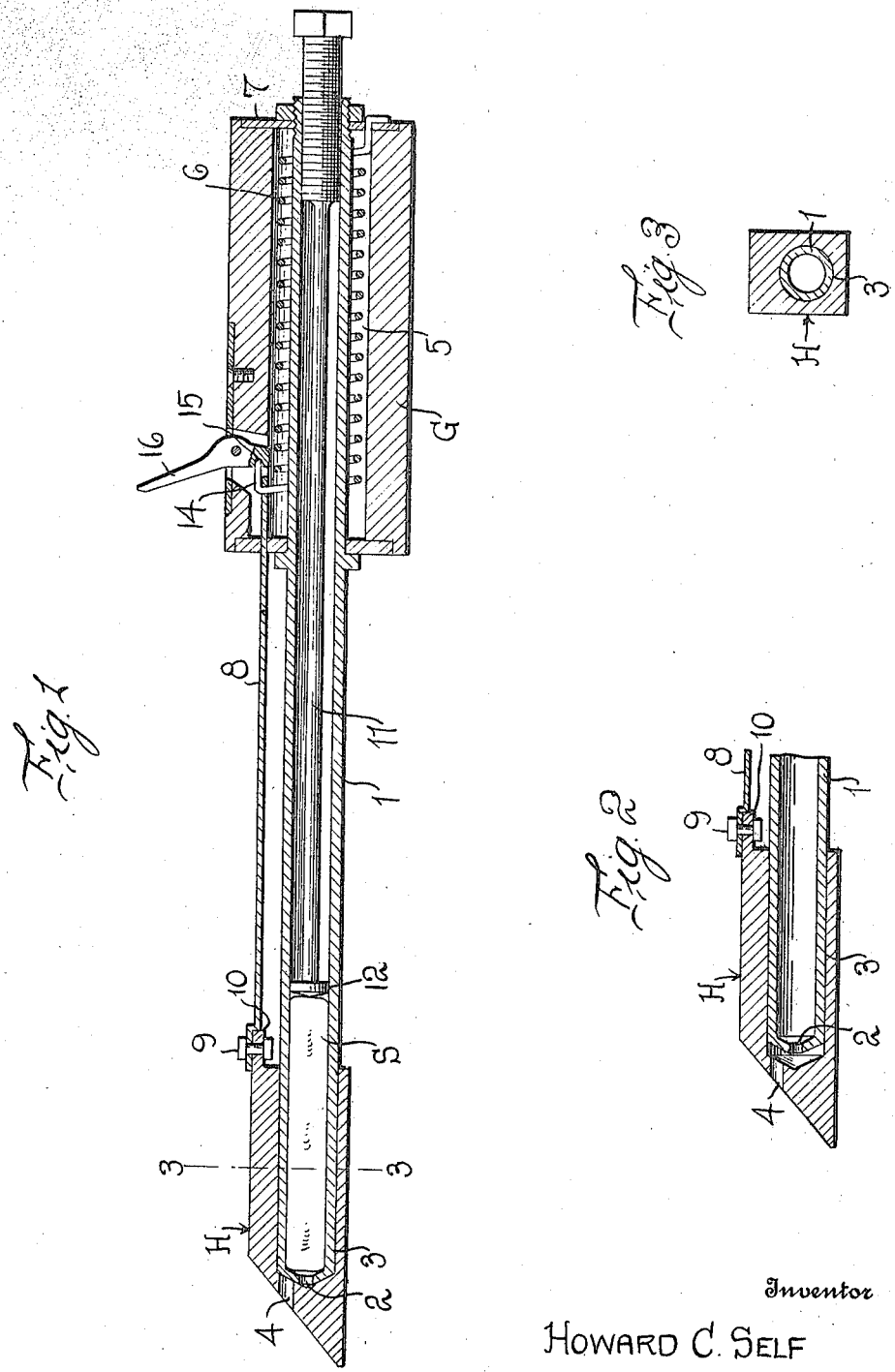
H. C. SELF.
SOLDERING IRON.
APPLICATION FILED JAN. 4, 1917.
1,233,614.
Patented July 17, 1917.
Inventor
HOWARD C. SELF
By Watson E. Coleman
Attorney

HOWARD C. SELF, OF MOUNT UNION, PENNSYLVANIA.

SOLDERING-IRON.

1,233,614. Specification of Letters Patent. Patented July 17, 1917.

Application filed January 4, 1917. Serial No. 140,581.

*To all whom it may concern:*

Be it known that I, HOWARD C. SELF, a citizen of the United States, residing at Mount Union, in the county of Huntingdon and State of Pennsylvania, have invented certain new and useful Improvements in Soldering-Irons, of which the following is a specification, reference being had to the accompanying drawings.

This invention relates to certain improvements in soldering irons and has relation more particularly to a device of this general character provided with a solder feed; and it is an object of the invention to provide a device of this general character having novel and improved means wherein the head or bit serves to control the discharge of the solder.

The invention also has for an object to provide a novel and improved soldering iron including a tubular shank adapted to maintain a charge of solder and wherein a head or bit is slidably mounted upon the shank and provided with a discharge opening adapted for communication with the bore of said shank and wherein said head or bit is movable longitudinally of the shank for controlling the discharge of the solder.

The invention consists in the details of construction and in the combination and arrangement of the several parts of my improved soldering iron whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a longitudinal sectional view taken through a soldering iron constructed in accordance with an embodiment of my invention;

Fig. 2 is a longitudinal sectional view taken through the head or bit end of the iron as herein set forth showing the head or bit in a second position; and Fig. 3 is a sectional view taken substantially on the line 3—3 of Fig. 1.

As disclosed in the accompanying drawings, 1 denotes an elongated tubular shank having one end provided with a restricted opening 2.

H denotes a head or bit of conventional construction and provided at one end with the longitudinally disposed socket 3 adapted to freely receive the end portion of the shank 1 provided with the restricted opening 2, and the outer end of the head or bit H is provided with the discharge opening 4 in communication with the inner end of the socket 3 but to one side of the restricted opening 2 so that when the head or bit H is at the limit of its inward movement relative to the shank 1, the opening 4 is closed against discharge.

The opposite end portion of the shank 1 has suitably secured thereto the hand grasp G having the intermediate portions of its bore enlarged, as at 5, and within said enlarged portion 5 of the handle is the retractile member 6 herein disclosed as a conventional coil spring encircling the shank 1 and suitably connected at one end to the washer 7 surrounding the shank 1 and overlying the outer end of the hand grasp G. The opposite end of the spring is anchored to the elongated rigid member 8 having its outer end portion secured, as at 9, to the inwardly directed lip or extension 10 of the head or bit H, whereby it will be perceived that the retractile member 6 serves to normally hold the head or bit H at the limit of its inward movement and thereby normally maintaining the opening 4 closed.

The tubular shank 1 is adapted to have inserted therein a stick S or the like of solder and which stick S is adapted to be forced toward the outer end of the shank 1 through the medium of the follower rod 11 extending within the shank 1 through the open end thereof remote from the restricted opening 2. The outer end of the follower rod 11 is enlarged, as at 12, and has its peripheral portion threaded so that the rod may be moved longitudinally of the shank 1 upon requisite rotation being imparted to the rod.

The end portion of the retractile member 6 connected to the rigid member 8 is returned, as indicated at 14, and the free end portion thereof is adapted to be received within the socket 15 formed in the inner end of the rock arm or latch 16 whereby it will be perceived that upon requisite movement being imparted to the extended portion of the rock arm or latch 16, the head or bit H will be moved outwardly upon the shank 1 to permit molten solder to be discharged through the opening 4.

It will also be understood that in operation the head or bit H is adapted to be heated in a well known manner and that the heat thereof will serve to melt the solder within the shank 1.

From the foregoing description, it is thought to be obvious that a soldering iron constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. A device of the character described comprising a tubular shank provided with a restricted opening at one end, a head provided with a socket to freely receive the end portion of the shank provided with the restricted opening, said head being movable in a direction longitudinally of the shank and having a discharge opening in communication with the inner end of the socket and automatic means for normally holding the inner end of the socket in the head in contact with the adjacent end of the shank for closing the restricted opening of the shank, and a follower extending within the tubular shank.

2. A device of the character described comprising a tubular shank provided with a restricted opening at one end, a head provided with a socket to freely receive the end portion of the shank provided with the restricted opening, said head being movable in a direction longitudinally of the shank and having a discharge opening in communication with the inner end of the shank and at one side of the restricted opening in the shank, automatic means for normally holding the inner end of the socket of the head in contact with the adjacent end of the shank for closing the restricted opening of the shank, and means for moving the head outwardly and longitudinally of the shank to permit a flow through the opening in the shank and the opening in the head.

3. A device of the character described comprising a tubular shank provided with a restricted opening at one end, a head provided with a socket to freely receive the end portion of the shank provided with the restricted opening, said head being movable in a direction longitudinally of the shank and having a discharge opening in communication with the inner end of the shank and at one side of the restricted opening in the shank, a rigid member secured to the inner end portion of the head and extending inwardly and longitudinally of the shank, automatic means coacting with the rigid member for normally holding the inner end of the socket of the head in contact with the adjacent end of the shank for closing the restricted opening of the shank, and means carried by the shank coacting with the rigid member for imparting outward movement to the rigid member and the head to permit a discharge through the opening in the shank and the opening in the head.

4. A device of the character described comprising a tubular shank provided with a restricted opening at one end, a head provided with a socket to freely receive the end portion of the shank provided with the restricted opening, said head being movable in a direction longitudinally of the shank and having a discharge opening in communication with the inner end of the shank and at one side of the restricted opening in the shank, a rigid member secured to the inner end portion of the head and extending inwardly and longitudinally of the shank and automatic means coacting with the rigid member for normally holding the inner end of the socket of the head in contact with the adjacent end of the shank for closing the restricted opening of the shank, a rock arm carried by the shank and coacting with the rigid member for imparting outward movement to the rigid member and the head to permit a passage through the opening of the shank and the opening in the head.

5. A device of the character described comprising a tubular shank provided with a restricted opening at one end, a head provided with a socket to freely receive the end portion of the shank provided with the restricted opening, said head being movable in a direction longitudinally of the shank and having a discharge opening in communication with the inner end of the shank and at one side of the restricted opening in the shank, a rigid member secured to the inner end portion of the head and extending inwardly and longitudinally of the shank, a coil spring surrounding the shank and secured at one end to the rigid member and at its opposite end to the shank, said coil spring serving to normally hold the inner end of the socket of the head in contact with the adjacent end of the shank for closing the restricted opening in the shank, and means carried by the shank coacting with the rigid member for imparting outward movement to the rigid member and the head to permit a discharge through the opening in the shank and the opening in the head.

In testimony whereof I hereunto affix my signature in the presence of two witnesses.

HOWARD C. SELF.

Witnesses:
  ROY M. KREPPS,
  O. J. CASSADY.

Copies of this patent may be obtained for five cents each, by addressing the "Commissioner of Patents, Washington, D. C."